United States Patent [19]

Osawa

[11] Patent Number: 5,033,923

[45] Date of Patent: Jul. 23, 1991

[54] ROTARY TOOL

[76] Inventor: Eiichi Osawa, 5-16-54 Yoshida, Higashi-Osaka, Osaka, Japan

[21] Appl. No.: 547,633

[22] Filed: Jul. 2, 1990

[30] Foreign Application Priority Data

Dec. 18, 1989 [JP] Japan .................................. 1-46191

[51] Int. Cl.⁵ .............................................. B23C 5/16
[52] U.S. Cl. .................................... 409/131; 29/901; 51/169; 74/573 R; 82/903; 279/1 ME; 279/1 C; 407/30; 407/120; 409/234
[58] Field of Search ........................ 279/1 J ME, 1 C; 409/232, 234, 131, 132; 29/901; 408/238, 239 R A, 1 R; 74/573 R; 82/903; 407/30, 120; 51/169

[56] References Cited

U.S. PATENT DOCUMENTS

| 2,958,165 | 11/1960 | Hofmann | 51/169 |
| 3,029,567 | 4/1962 | Gregora | 51/169 |
| 3,151,488 | 10/1964 | Tracy et al. | 74/573 R |
| 3,838,464 | 9/1974 | Doyle | 74/573 R X |
| 4,865,336 | 9/1989 | Keritsis | 279/1 J X |

Primary Examiner—Steven C. Bishop
Attorney, Agent, or Firm—Welsh & Katz, Ltd.

[57] ABSTRACT

A rotary tool is provided with a shank and a collar-like section, and further includes a plurality of screw-threaded holes drilled in a vertical end face of the collar-like section, in parallel relationships with the axis of the collar-like section. A plurality of balancing weights are removably screwed in the holes as required to balance the tool.

3 Claims, 1 Drawing Sheet

U.S. Patent
July 23, 1991
5,033,923
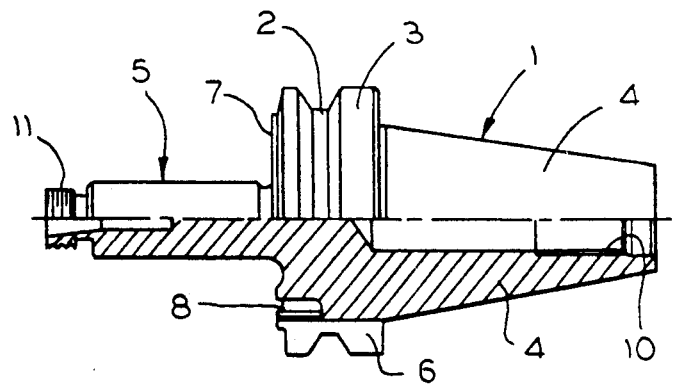
FIG.1
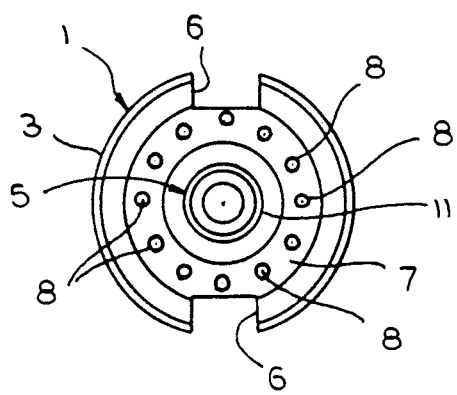
FIG.2
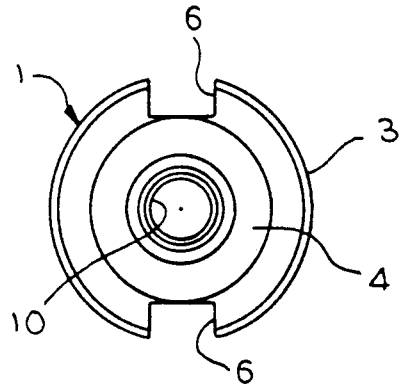
FIG.3
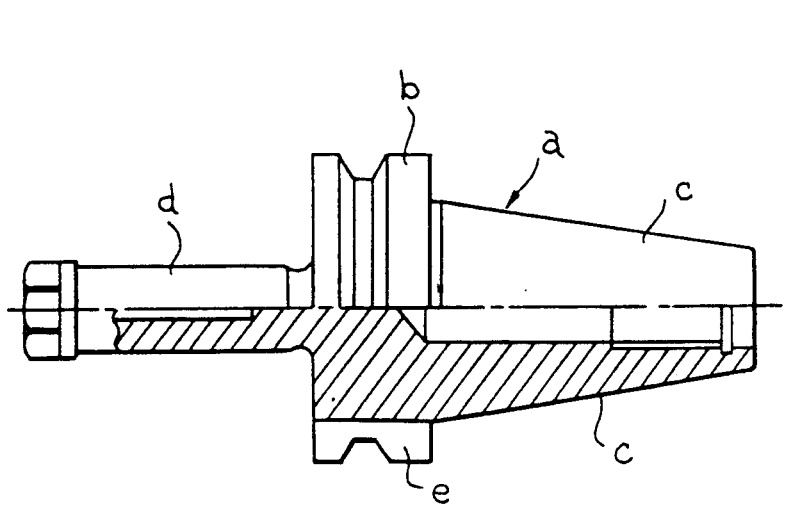
FIG.4
FIG.5
(PRIOR ART)

ROTARY TOOL

The present device relates to a high-speed rotary tool such as a holder for a drill, rotary cutting, grinding tools or the like.

BACKGROUND OF THE INVENTION

Where mechanical machining is performed by a drilling machine, boring lathe or grinding machine, the vibration of the rotary tool presents a serious problem. One of the causes of teh problem is considered to be the forced vibration due to the rotary tool being or becoming unbalanced.

As one example of a conventional rotary tool, there is a tool holder (a) shown in FIG. 5, which is provided with a clamp section (b) for an automatic tool exchanger. The tool holder has at one end thereof a tapered shank (c) and a tool mounting section (d) at the other end thereof, with the clamp section (b) being provided with an engaging groove cominginto engagement with the main spindle of a machine tool.

Where the too holder (a) is used with a highspeed rotary too, it is subjected to a balancing test using a balancing machine. The angle of the tool holder and the weight thereof corresponding to that angle are indicated by the blaancing machine. When teh weight of the tool holder is large, the excess portion of the holder is removed by cutting, thereby correcting the unbalanced condition of the holder.

However, the above-mentioned unbalancing correcting method requires skill and a considerable amount of time. In order to obtain a high degree of accuracy of balancing, it is extremely cumbersome, which results in lowering the working efficiency to a considerable degree.

The present device has been made in view of the above-described situation. Accordingly, an object of the present device is to provide a rotary tool which is capable of being balanced easily, accurately and efficiently.

SUMMARY OF THE INVENTION

In order to achieve the above object, the present device employs the following technical means. A rotary tool is provided with a shank and a collar-like section. A plurality of screw-threaded holes are drilled in a vertical end face of the collar-like section in parallel relationship with the axis of the collar-like section, and a plurality of balancing weights are removably screwed into the holes.

According to the present device, it is sufficient that a weight or weights corresponding to the weight of the lower weight portion of the tool be inserted into the screw-threaded hole or holes in that portion according to the results of the balancing test.

Further, the balancing operation of the rotary tool may be performed in such a manner that the weights, each having a predetermined weight, are screwed into all the screw-threaded holes in advance. After conducting a balancing test, any unsuitable weight in view of the results of the test is replaced with another having a different weight.

BRIEF DESCRIPTION OF THE DRAWINGS

FIGS. 1 through 4 show one embodiment of the present device, wherein:

FIG. 1 is a front view (in partial cross-section) of a rotary tool according to the present device, FIG. 2 is a left-side view of the rotary tool of FIG. 1, FIG. 3 is a right-side view of the rotary tool of FIG. 1, and FIG. 4 is a perspective view of a weight used in the present device.

FIG. 5 is a front view (in partial cross-section) of a conventional rotary tool.

DETAILED DESCRIPTION OF THE INVENTION

The present device will now be described with reference to the accompanying drawings.

In FIGS. 1 through 3, reference numeral 1 designates a rotary tool (a collet chuck holder or a drill chuck holder, etc.) which is provided at the center thereof with a clamp section for engagement with an automatic tool exchanger, that is, a collar-like section 3 having a peripheral groove 2 at the center, a tapered shank 4 formed at one side thereof in the axial direction so as to engage the main spindle of a machine tool, and a tool mounting section 5 formed at the side opposite the shank 4.

On the outer periphery of the collar-like section 3 there are provided two engaging grooves 6 in symmetrical relationship with each other with respect to the axis of the section 3 so as to mate with the main spindle of the machine tool. Further, in an end face 7 of the collar-like section 3 (the side end surface adjacent to the tool mounting section 5) there are drilled a total of 12 screw-threaded holes 8 along the same circumference drawn about the axis of the section 3 at intervals of a rotational angle of 30° and in parallel relationship with that axis, so as to receive weights 9 thereto, respectively. These holes 7 have the same diameter and depth such that when the weights 9 are respectively screwed into the holes 8, each of the weights does not project from the end face 7 of the collar-like section 3.

The weights 9 are in the form of an unheaded screw as shown in FIG. 4, and a number of such weights having slightly different weights (that is, length) are prepared as substitutes.

Reference numeral 10 designates a screw-threaded hole for receiving a pull-tap, and reference numeral 11 designates a male-screw for receiving a chuck.

In the instant embodiment, where the rotary tool 1 is found unbalanced as a result of a balancing test using a balancing machine, since the angle of the tool 1 and the weight thereof corresponding to the angle are indicated by the balancing machine, the tool 1 can be brought into a balanced state by merely screwing into the screw-threaded hole or holes in the smaller weight portion of the collar-like like section a weight or weights 9 having a weight corresponding to that portion.

Further, as described in the foregoing, a plurality of weights 9 of a predetermined weight may be screwed into all the screw-threaded holes 8 of the rotary tool 1 in advance. When the tool 1 is found unbalanced as a result of a balancing test, any of the weights 9 causing such unbalance may be replaced with another weight having a different weight, thereby balancing the tool 1.

The many advantages of the present invention are now apparent. The present device provides a rotary tool having a shank and a collar-like section. A plurality of screw-threaded holes are drilled in the vertical end face of the collar-like section in parallel relationships with the axis of the latter, and a plurality of balancing weights are removably screwed into the screw-threaded holes. Accordingly, the balancing operation for the rotary tool can be performed easily, accurately and efficiently, and the rotary tool requires no cutting operation. In addition, since there is no fear of the balancing weights coming out of the screw-threaded holes, it can be safely operated even at a high speed.

The present invention is not limited to the above embodiment but it may be employed for various kinds of holders other than the collet holder and high-speed rotary tools. Moreover, the screw-threaded holes may be drilled in a zigzag fashion and the weight may be made of a synthetic material besides metals.

What is claimed is:

1. A rotary tool comprising
   shank means for engaging a machine tool,
   a collar-like section secured to said shank means, said shank means and said collar-like section having a common central rotational axis,
   said collar-like section having an end face which is substantially perpendicular to said axis,
   a plurality of cylindrical orifices which extend through said end face substantially parallel to said axis, and
   at least one removable balancing weight in at least one of said orifices for balancing the rotary tool,
   whereby the rotary tool may be balanced by inserting additional weights in said orifices or removing weights from said orifices.

2. The rotary tool of claim 1 wherein said orifices are along the same circumference drawn about said axis, at about 30° rotational angle intervals about said axis, and in parallel relationship with said axis.

3. A method of making parts with a machine tool comprising the steps of
   securing a rotary tool in a balancing machine, said rotary tool having a central rotational axis,
   balancing said rotary tool by identifying any unbalanced conditions in said rotary tool with said balancing machine and inserting at least one weight in one of a plurality of orifices in the rotary tool, to correct said unbalanced condition, said orifices being spaced from and parallel to said axis,
   securing said balanced rotary tool in the machine tool, and
   making at least a portion of the parts in the machine tool using said balanced rotary tool.

* * * * *

UNITED STATES PATENT AND TRADEMARK OFFICE
CERTIFICATE OF CORRECTION

PATENT NO. : 5,033,923
DATED : July 23, 1991
INVENTOR(S) : Eiichi Osawa

It is certified that error appears in the above-identified patent and that said Letters Patent is hereby corrected as shown below:

Column 1, line 12, change "teh" to --the--.
Column 1, line 21, change "cominginto" to --coming into--.
Column 1, line 23, change "too" to --tool--.
Column 1, line 23, change "highspeed" to --high-speed--.
Column 1, line 24, change "too" to --tool--.
Column 1, line 27, change "blaacing" to --balancing--.
Column 1, line 27, change "teh" to --the--.

Signed and Sealed this

Fifteenth Day of December, 1992

Attest:

DOUGLAS B. COMER

*Attesting Officer*   *Acting Commissioner of Patents and Trademarks*